United States Patent Office 3,833,694
Patented Sept. 3, 1974

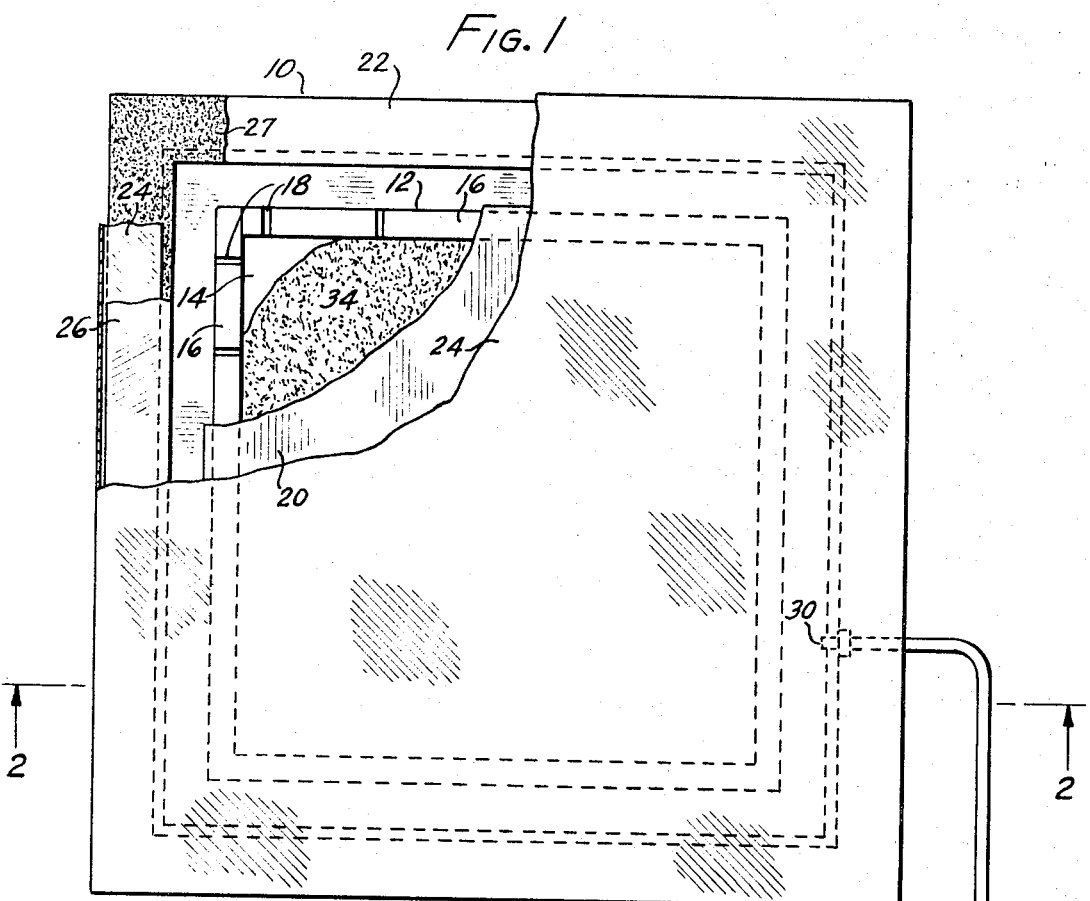

3,833,694
MOLDING POLYURETHANE FOAM IN A MOLD HAVING A CYCLICALLY FLEXING COVER
Charles R. Hughes, Hellertown, Pa., assignor to Bethlehem Steel Corporation
Filed July 5, 1972, Ser. No. 268,942
Int. Cl. B29d 27/00
U.S. Cl. 264—51
2 Claims

ABSTRACT OF THE DISCLOSURE

A polyurethane foam core wall panel is produced by placing a quantity of foam in a mold comprising a bottom panel, a border and a top panel, and, while the expanding foam is in contact with the top panel, cyclically flexing the top panel until the foam has completely filled the mold.

BACKGROUND OF THE INVENTION

This invention relates to a method of producing molded shapes of expanded plastic foam, and more particularly to a method of producing foam core wall panels.

It is broadly old to produce foam core wall panels by providing a mold comprising a horizontally disposed bottom panel, e.g. a steel sheet, provided with a border, e.g. 2" x 4" pieces of wood, to impart depth to the finished panel. An expandable plastic foam, e.g. polyurethane foam liquid, is then poured onto the bottom panel. The polyurethane liquid, which is generally produced by admixing an isocyanate with a mixture comprising a polyol, a blowing agent, a catalyst and a surfactant, rapidly expands within a few seconds after pouring. This expansion is due to boiling of the blowing agent as a result of the heat of the chemical reaction between the components. A cover, comprising a top panel, is then placed on the top of the mold. The expanding foam subsequently makes contact with the bottom of the top panel and substantially completely fills the mold.

It has been found that foam core panels formed in the above-described manner are characterized by voids near the corners thereof. It is accordingly an object of this invention to provide a method for producing foam core panels in which the entire core is filled with foam.

SUMMARY OF THE INVENTION

I have discovered that the foregoing object can be obtained by cyclically flexing the top panel of the mold, while the expanding foam is in contact with the top panel, until the mold is completely filled. The flexing mechanically pushes the foam into the corners of the mold.

BRIEF DESCRIPTION OF THE DRAWINGS

FIG. 1 is a diagrammatic plan view, partly in section, of an apparatus for performing the method of the invention.

FIG. 2 is a sectional view of said apparatus through the lines 2—2 of FIG. 1.

DESCRIPTION OF THE PREFERRED EMBODIMENT

As shown in the drawings, the subject apparatus broadly comprises a rigid box 10, which may be steel, into which a mold 12 is placed. The mold comprises a bottom panel 14 and a vertical border 16, comprising 2" x 4" wooden members, for example. The vertical border 16 is provided with vent holes 18. A flexible top panel 20 serves as a cover for the mold 12 and the outer skin of the finished panel.

The box 10 is provided with a peripheral flange 22 which serves as a base for a vacuum seal comprising a flexible force transmitting member 24, e.g. a thick vinyl sheet, which is held between said flange 22 and a square sealing plate 26. A soft foam gasket 27 is provided between the flange 22 and the member 24 to ensure a good seal. A vacuum pump 28 is connected to a port 30 in the box 10.

Connected to the vacuum pump 28 is a limit switch 32 which turns the vacuum pump on and off as the pressure in the box 10 increases and decreases beyond predetermined limits. For example, the pump may be turned on when the pressure reaches 1.0 inches of mercury. The box is then evacuated until the pressure drops to 1.5 inches of mercury, at which time the switch 32 automatically turns off the pump 28.

Initially, the mold is open, i.e. the force transmitting member 24 is not on the vacuum box 10 and the top panel 20 is not on the mold. A predetermined amount of foam liquid 34 is then poured onto the bottom panel 14. This foam liquid may comprise, for example, a mixture of the polyfunctional isocyanate "Mondur MR" and a liquid comprising 43.4 wt. percent of the polyglycol "Voranol SA–1049." 28.9 wt. percent of the blowing agent "Freon-11B," 1.35 wt. percent of the catalyst "Dabco–33LV," 1.35 wt. percent of the surfactant "Dow Corning 193," and 15.0 wt. percent of a fire-retardant polyol "Fyrol 6."

The top panel 20 is then placed on the mold and the force transmitting member 24 placed on the vacuum box 10. The vacuum pump 28 is next actuated to create a pressure of 1.8 inches of mercury in the mold, although it is not essential to the invention to actuate said pump until the foam 34 has expanded to the point where it makes contact with the top panel 20.

The reduced pressure in the mold causes the force transmitting member 24 and the top panel 20 to bow downwardly. After the desired pressure is reached, the limit switch 32 shuts off the pump 28, and the pressure within the mold then slowly increases, due to leakage around the force transmitting member 24 or a valved air inlet, until it reaches 1.0 inches of mercury. The top panel 20 is bowed to a much lesser extent at this pressure. In response to this increased pressure, the limit switch 32 actuates the pump to again decrease the pressure within the mold. The increase and decrease of pressure within the mold causes the top panel 20 to flex at a rate of 12 to 20 cycles per minute, although the exact frequency does not appear to be critical.

When the foam 34 makes contact with the top panel 20, the flexing thereof physically pushes the foam into the corners of the mold. The flexing is continued until the foam has substantially completely filled the mold. Not only are the corners of the mold completely filled; in addition, the foam core is characterized by less shear marks than foam cores produced by the aforementioned prior art method.

While the top panel 20 has been described as being flexed by means of variation in air pressure, the top panel 20 can also be flexed mechanically, e.g. by having a rotating cam in contact therewith which exerts a variable force against its surface.

A foam core panel produced by the method of the invention may be used as a wall panel for factory built housing. If the foam core panel is large however, it may be necessary to apply a force against the top panel during solidification of the foam core, e.g. by a press or other means, to prevent the top panel from bowing outwardly.

I claim:

1. In a method of producing a molded shape of expanded plastic foam in which a quantity of expandable liquid foam is placed in contact with the horizontally disposed bottom panel of an open-top mold comprising said bottom panel having a vertical border therearound, the improvement comprising:
(a) placing a flexible cover over said mold; and
(b) after said foam has made contact with said cover cyclically flexing said cover to bow said cover downwardly and mechanically push said foam into the corners of said mold until the foam has substantially completely filled the mold.

2. In a method of producing a molded shape of expanded plastic foam in which a quantity of expandable liquid foam is placed in contact with the horizontally disposed bottom panel of an open-top mold comprising said bottom panel having a vertical border therearound, the improvement comprising:
(a) placing a flexible cover over said mold, the outside of said cover being subjected to atmospheric pressures;
(b) providing subatmospheric pressure within said mold while said foam expands; and
(c) after said foam has made contact with said cover raising and lowering said subatmospheric pressure within said mold to cyclically flex said cover to bow said cover downwardly and mechanically push said foam into the corners of said mold until the foam has substantially completely filled the mold.

References Cited

UNITED STATES PATENTS

| | | | |
|---|---|---|---|
| 2,128,336 | 8/1938 | Torstensson | 72—16 |
| 2,873,481 | 2/1959 | Semegen | 264—48 X |
| 3,072,584 | 1/1963 | Karpovich. | |
| 3,240,846 | 3/1966 | Voelker | 264—47 |
| 3,326,787 | 6/1967 | Jacobs | 264—45 X |
| 3,417,168 | 12/1968 | Keith | 264—45 X |
| 3,431,331 | 3/1969 | Pincus et al. | 264—45 X |
| 3,381,066 | 4/1968 | Lowe et al. | 264—313 X |
| 3,470,279 | 9/1969 | Abbott | 264—313 X |
| 3,639,550 | 2/1972 | Darmochwal | 264—54 X |

HERBERT S. COCKERAM, Primary Examiner

U.S. Cl. X.R.

264—69, 71, 316, 321; 425—405, 432, 817 R